United States Patent
Jackson, III (10) Patent No.: US 10,499,634 B2
(45) Date of Patent: Dec. 10, 2019

(54) SQUIRREL CREEPERS, A POWER SYSTEM SQUIRREL DETERRENT

(71) Applicant: Denton L Jackson, III, Coldwater, MS (US)

(72) Inventor: Denton L Jackson, III, Coldwater, MS (US)

(*) Notice: Subject to any disclaimer, the term of this patent is extended or adjusted under 35 U.S.C. 154(b) by 384 days.

(21) Appl. No.: 15/649,028

(22) Filed: Jul. 13, 2017

(65) Prior Publication Data
US 2019/0014771 A1 Jan. 17, 2019

(51) Int. Cl.
*A01M 29/30* (2011.01)
*H02G 7/00* (2006.01)

(52) U.S. Cl.
CPC .............. *A01M 29/30* (2013.01); *H02G 7/00* (2013.01)

(58) Field of Classification Search
CPC ....... A01M 29/30; A01M 29/00; A01G 17/12; A01G 13/0237
See application file for complete search history.

(56) References Cited

U.S. PATENT DOCUMENTS

| 1,996,894 | A | * | 4/1935 | Alvord | E04H 12/00 52/101 |
| 4,815,235 | A | * | 3/1989 | Faltinowski | A01G 13/10 52/101 |
| 6,877,400 | B2 | * | 4/2005 | Weaver | B25B 9/00 269/6 |

* cited by examiner

*Primary Examiner* — Kristen C Hayes
(74) *Attorney, Agent, or Firm* — Charles F. Rye

(57) ABSTRACT

Squirrels and other climbing vermin cause many millions of dollars damage and otherwise unnecessary maintenance annually to the national power grid and standalone assets. Among the negative effects is when the vermin unwittingly create a short out condition which may simply blow a fuse or trip a circuit out causing loss of service. The current invention utilizes spikes arranged to inhibit egress, rotating surface spines to create an unsteady grasp and a pivot arm having T bars presented for opportunistic climbers. However, as the vermin applies its body weight to the T bar the pivot arm rotates bringing claw spikes from behind the base spike array to create an apparent capture motion combined with the distal ends of the claw spikes giving a tactile tap to the body of the vermin. The Squirrel Creeper also incorporates a hotline clamp as a mounting means which allows installation and removal via a hotline stick.

18 Claims, 4 Drawing Sheets

SQUIRREL CREEPERS, A POWER SYSTEM SQUIRREL DETERRENT

CROSS-REFERENCE TO RELATED APPLICATIONS

NONE

BACKGROUND OF THE INVENTION

Squirrels and other climbing vermin cause many millions of dollars damage and otherwise unnecessary maintenance annually to the national power grid and standalone assets. Among the negative effects is when the vermin unwittingly create a short out condition which may simply blow a fuse or trip a circuit out causing loss of service. During the short out condition in higher voltage applications the event can create destructive plasma that can cause even more expensive physical damage well beyond a simple trip out. And there is the issue of direct damage caused by chewing and other activity.

Animal and bird guards are old in the industry as the need for such became apparent as soon as a grid was developed, Many variations of devices to prevent contact by the animal or bird between high and lower potentials exist. Another avenue is to prevent the creature from getting to the area where contact may be made or actual physical damage by the creature, chewing etc., can be accomplished.

Many variations of animal deterrents for power grid and other assets appear in patents and non-patented devices. They range from spike guards to collars to rotating drum and collar sections to electrical detection and shock deterrent to even fluid spray for birds. The current invention utilizes spikes arranged to inhibit egress, rotating surface spines to create an unsteady grasp and a pivot arm having T bars presented for opportunistic climbers. However, as the vermin applies its body weight to the T bar the pivot arm rotates bringing claw spikes from behind the base spike array to create an apparent capture motion combined with the distal ends of the claw spikes giving a tactile tap to the body of the vermin.

PRIOR ART

U.S. Pat. No. 1,766,636 issued to Holzel Oct. 8, 1926 describes spikes attached to features designed to accommodate attachment to electrical system parts. Holzel typifies that spike deterrents have been known in the art for many years. However, Holzel does not provide any moving features activated by the creature nor unsteady, rotating grasp features.

U.S. Pat. No. 4,201,883 issued to Shepherd May 6, 1980 describes a dielectric disk attached to an insulator around a high tension lead to prevent a creature from contacting the lead and the body the insulator is attached upon. The current invention provides for a base member which may be dielectric and may be in contact with, attached, to a high tension lead, elongated structure.

U.S. Pat. No. 5,650,594 Issued to Urnovitz Jul. 22, 1997 describes a planar insulator to be attached to a system by passing the insulator via a slot over a lead wire. Urnovitz also provides for holes and cutouts opposite said slot adaptive for an equivalent to a hotline stick. The adaptation to be installed by an elongated holding tool was intended to allow compliance with the then new OSHA requirement that workers maintain at least one to two foot separation from any features charged over 600 volts. The current invention accommodates remote installation via a hotline clamp utilized as the mounting feature installed via a hotline stick in the preferred embodiment.

U.S. Pat. No. 6,519,901 issued to Nelson Feb. 18, 2003 describes an electrical detecting system to detect vermin contact and provide an electric shock to the offending creature. The current invention utilizes physical movement of a pivot arm energized by the creature's own weight attempting to use T bars attached to the pivot arm to provide a tactile tap on the creature's body along with the curved claw spikes appearing to be a closing structure to frighten the creature away from attempting to traverse the structure.

U.S. Pat. No. 7,541,546 issued to Vojtile Jun. 2, 2009 describes a substantially disk shaped deterrent with a circumference of petal like structures. Vojtile also provides for passing the disk over a structure via a slot having resilient walls to close the slot after installation and further solid areas spaced on the circumference describing apertures to accommodate attachment to a hotline stick clamp for installation. Vojtile does not provide any feature movement triggered by the creature attempting to traverse the deterrent.

U.S. Pat. No. 8,978,586 issued to Carter Mar. 17, 2015 describes denying access to a bird feeder by the weight of a squirrel causing the bird access opening to close. That invention does utilize the weight of the squirrel to create mechanical motion but it does not provide for spikes to create an apparent capture or a tactile tap to the body of the squirrel or any rotating features to create an unsteady grip.

DESCRIPTION OF THE INVENTION

The current invention utilizes a base member (2) upon which all other features are directly or indirectly attached. The invention is substantially intended to be mounted on an elongated structure (1). The elongated structure is most often a power line or guide wire but may also include solid rods that may be attached to another structure at only one end.

Each of the surfaces of a first end region of the base member has a plurality of spikes. The base spikes are divided into two major groups. The first group of base spikes (16) has a curved distal end to present the point facing the expected path of the vermin to be deterred. The second group of base spikes (20) has a curved length again to present the point toward the expected path. A spike mounting means attaches the spikes to the base member. The base spikes attach means may include: fusing, gluing, the proximal end of the spikes being threaded and screwed into the base member, The proximal end of the spikes bent into an eyelet and a fastener passed through the eyelet, and other methods of attaching. The preferred embodiment includes the base member having spike bores (10, 12) and the proximal end shafts of the base spikes accommodating a press fit.

An extended pivot arm stand means (25) is now added to the invention. The pivot arm stand is attached to the upper surface of the base member in its mid region behind the base spikes. The pivot arm stand means may include: opposing L brackets, a body unitary to the base member, a rod and other structures. The pivot stand attach means may include: fasteners, glue, fusion, socketed self-locking joint and other means. A pivot arm (31) is attached to the distal end of the pivot arm stand. The distal end of the pivot stand and the mid region of the pivot arm define complementary apertures to receive a pivot-able joining means. The pivot arm attach means may include: a shouldered rivet, a pin and cotter pin or circlip; or a shaft fused, to one feature and pivoting in the other with a keeper, A single pivot stand L bracket (25) is utilized as the in the preferred embodiment with pivot stand attach screws (30). For simplicity in the preferred embodiment a bolt, washers and a lock nut (39, 40, 41) are utilized to attach the pivot arm and allow free rotation. The distal end of the arm extends past the base spikes.

A claw base means (42) with claw spikes (50) is attached to the pivot arm between the pivot arm to pivot stand mounting point and the pivot arm proximal end. The claw spike base is substantially perpendicular to the pivot arm. The claw spike base means may include: a rod, angle stock, tube stock and unitary. In the preferred embodiment the claw spike base is flat bar having a length width and thickness. The claw spikes have a curved length and their distal end is pointed. Again the base spike spacing and claw spike spacing accommodate the claw spikes rotating through the base spikes to access the squirrel having applied it weight to a T bar. The proximal end of the claw spikes is attached to the claw base. The claw spike to claw base attach means may be: welded, fused, glued, unitary, the claw spike proximal end formed into an eyelet and a fastener, or press fit. In the preferred embodiment the proximal end of the claw spikes is threaded and passed into apertures provided in the claw base with a nut above and below the claw base. The preferred claw base mounting means is a T bracket (45) with companionate apertures on the claw base and on the upper T blades and an aperture on the lower blade of the T and a companionate aperture on the pivot arm attached by a bolt and nut. This also provides to adjust the claw spikes relative to the pivot arm.

At least one T bar (56) is attached to the distal end of the pivot arm, nearest the base spikes. The attach means may include: fusing, gluing, unitary or press fit. The base spikes and pivot stand are positioned to allow the pivot arm to rotate through the spikes. The T bar(s) is mounted parallel to the pivot arm pivot axis. The T bar(s) is presented just in front of the base spike points. In the preferred embodiment the pivot arm has distal T bar apertures provided as the mounting means and the T bar has at least a threaded mid-section and nuts (60) on each side of the pivot arm.

A counter weight means and attach means are mounted on the proximal end of the pivot arm. The counter weight and attach means may be: unitary to the arm, fused, glued or fastened. In the preferred embodiment the proximal end of the pivot arm provides a counter weight mounting aperture (38), counter weight (61) and attaching bolt and nut (63, 64). The counter weight brings the pivot arm back near the base member's upper surface.

The counter weight brings the pivot arm back near the upper surface of the base member after the squirrel removes its weight from a T bar. However many possible applications are not horizontal, especially guide wires. As the angle of the base member increases from horizontal the effectiveness of the counter weight is diminished. This is further aggravated by the fact that the first end region is presented toward the direction of expected vermin travel i.e. a guide wire installation would have the squirrel guard in a pronounced nose down position. Therefore an adjustable recoil means is added to the invention. The recoil means may include; a torsion spring acting around the pivot arm mounting means acting against pins on the pivot stand and pivot arm; a fixed to base member end leaf spring acting on the pivot arm and other recoil arrangements. In the preferred embodiment a length of coil spring (91) is connected between the proximal end of the pivot arm and a feature on the base member. In order to provide sufficient length of the recoil spring to give the desired travel and return of the proximal end of the pivot arm a spring standoff bracket (85) is attached to the second end region of the base member. The first end loop of the spring is fitted over an extended end of the counter weight mounting bolt and another nut is added to capture the end loop. The recoil spring is wrapped through the standoff bracket and a lower spring attach means is provided on the lower surface of the base member. The lower spring attach means further provides for adjustability. The lower spring attach means may be: unitary to the base member, press fit or fused with adjustment slots; a rod with a pinch clamp and hook for the second end loop, etc. In the preferred embodiment a threaded shaft base member spring attach stud (96) is mounted into the lower surface of the base member. Two nuts (100) with washers between them serve to capture the second end loop of the recoil spring and provide tension adjustment.

Since squirrels can travel upside down, rotating surface spines (78) are provided. Should a squirrel approach the lower surface of the squirrel guard it would encounter a rotating surface spine. A rotational outer member is fitted over a rotating surface spine shaft with a distal end retaining means. The surface of the rotational outer member may be smooth or convoluted. The proximal end of the shaft is mounted into the lower surface of the base member. As a squirrel may attempt to use the rotational outer member to assist in climbing the rotation creates an unsteady grip to deter the squirrel.

The base member (2) is attached to the elongated structure via a mounting means (71). The mounting means may include: a U bolt with its threaded ends passing through the base member; a J bolt similarly attached; a clamp designed to clamp pipes to a flush surface and any other similar attach means, in the preferred embodiment a hotline clamp (71), commonly known in the power distribution industry, is attached to the base member via a base member mounting L bracket (65). The long leg of the bracket is attached to the lower surface of the base member via screws, Hotline clamps normally include an aperture (73) which receives a cable clamping lug. The lug is removed and a bolt is passed through that aperture and a corresponding aperture in the short leg of the bracket. In the preferred embodiment a hotline clamp (71) is used because the eye bolt can be attached to a hotline stick and the entire squirrel guard lifted into place and attached to the elongated structure.

In order to deter rotation of the base member during installation base anti rotation means is provided opposite the base member mounting means which may include: a U channel bracket with its opening oriented away from the lower surface of the base member; a U channel unitary to the base member or a surface mount clamp as previously described. In the preferred embodiment anti rotation spikes (84) and base member bores (15) accommodating a press fit are provided on the lower surface of the base member opposite the clamp. These spikes are of group one having a curved distal end. The spikes are oriented on each side of the expected elongated structure and their tips are oriented away from each other to create a funnel action as the base member is positioned on the elongated structure.

DETAILED DESCRIPTION OF THE DRAWINGS

Figures 1, 2, 3, 4, 5, 6, 7, 8:
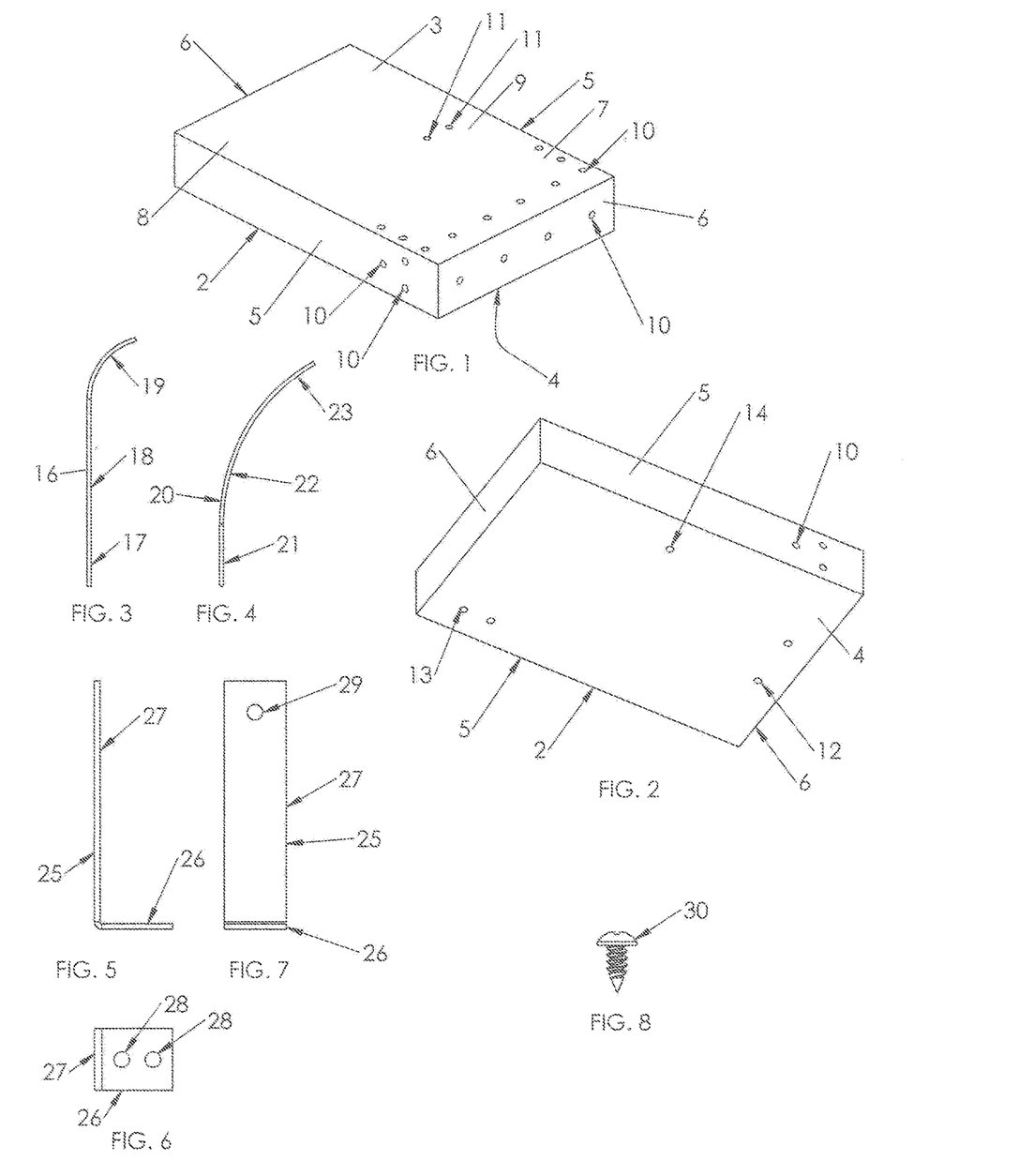
FIG. 1 shows an upper isometric view of rectilinear base member 2.
FIG. 2 shows a lower isometric view of rectilinear base member 2.
FIG. 3 shows a side view of one member of first group base spikes 16.
FIG. 4 shows a side view of one member of second group of said base spikes 20.
FIG. 5 shows an end view of pivot stand L bracket 25.
FIG. 6 shows a top view of pivot stand L bracket 25.
FIG. 7 shows a side view of pivot stand L bracket 25.
FIG. 8 shows a side view of pivot stand mounting screw(s) 30.

FIG. 1 shows an upper isometric view of rectilinear base member 2, also shown are: upper surface 3, lower surface 4, side surfaces 5, end surfaces 6; and first end region 7, second end region 8, mid region 9; and base spike bores 10, and pivot arm stand bores 11.

FIG. 2 shows a lower isometric view of rectilinear base member 2, also shown are; lower surface 4, side surfaces 5, end surface 6, spike bores 10; and anti rotation spike bores 12, mounting bracket bores 13, base member spring mount bore 14 and rotating surface spines bores 15.

FIG. 3 shows a side view of one member of first group base spikes 16, also shown are: proximal end 17, length 18, and distal end 19.

FIG. 4 shows a side view of one member of second group of said base spikes 20, also shown are: Proximal end 21, length 22, distal end 23 and curved length 24.

FIG. 5 shows an end view of pivot stand L bracket 25, also shown are proximal short arm 26, and long arm 27.

FIG. 6 shows a top view of pivot stand L bracket 25, also shown are also shown are proximal short arm 26, long arm 27 and mounting apertures 28.

FIG. 7 shows a side view of pivot stand L bracket 25, also shown are also shown are proximal short arm 26, long arm 27 and pivot arm mounting aperture 29.

FIG. 8 shows a side view of pivot stand mounting screw(s) 30.

Figure 9:
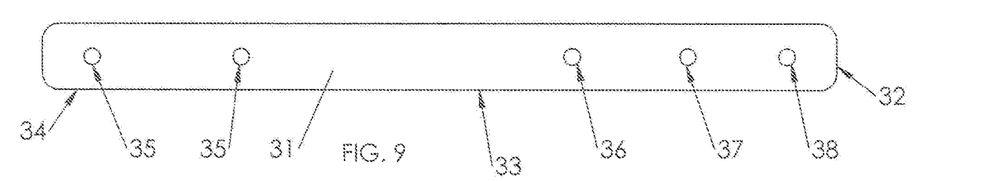
FIG. 9 shows a side view of pivot arm 31.

FIG. 9 shows a side view of pivot arm 31, also shown are: proximal end 32, mid region 33, distal end 34; and distal T bar apertures, mid pivot aperture 36, claw base aperture 37 and proximal weight aperture 38.

Figure 10:
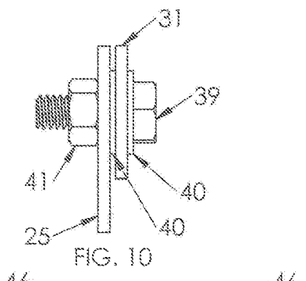
FIG. 10 shows an end view of pivot arm 31 joined to pivot stand L bracket 25.

FIG. 10 shows an end view of pivot arm 31 joined to pivot, stand L bracket 25 via attach bolt 39, washers 40 and lock nut 41.

Figure 11:
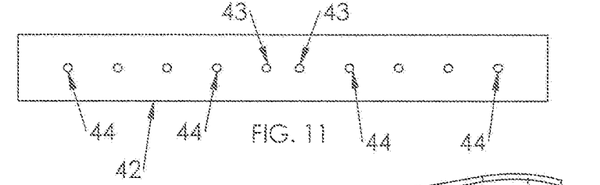
FIG. 11 shows a top view of a claw base 42.

FIG. 11 shows a top view of a claw base 42, also shown are mounting apertures 43 and claw spike mounting apertures 44.

Figure 12:
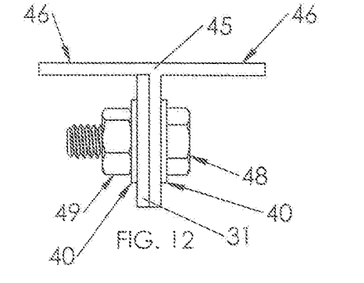
FIG. 12 shows an end view of claw base to arm T bracket 45.

FIG. 12 shows an end view of claw base to arm T bracket 45, also shown are claw base to T bracket apertures 46, mounting bolt 48 and lock nut 49.

Figures 13, 16, 17, 20:
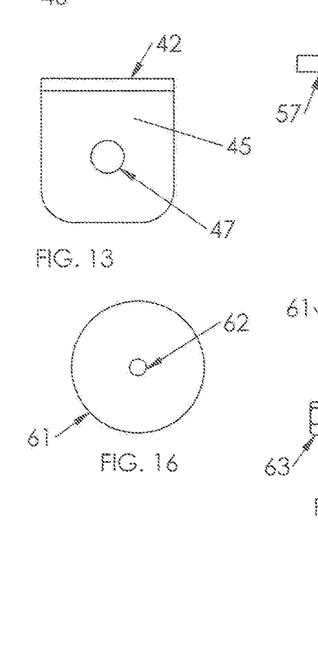
FIG. 13 shows a side view of claw base to arm T bracket 45.
FIG. 16 shows a side view of counter weight 61.
FIG. 17 shows an end view of counter weight 61 joined to pivot arm 31.
FIG. 20 shows a side view of L bracket to base member screws 70.

FIG. 13 shows a side view of claw base to arm T bracket 45, also shown are claw base 42, T bracket to pivot arm aperture 47.

Figure 14:
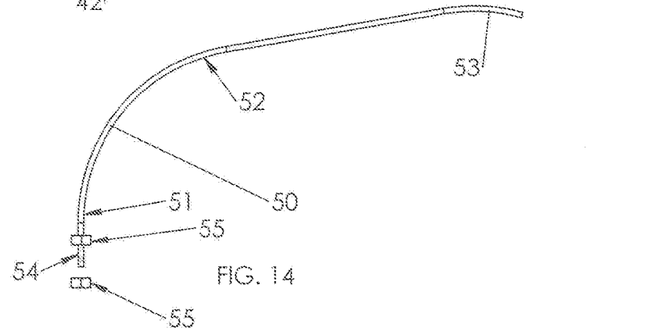
FIG. 14 shows a side view of one of a group of claw spikes 50.

FIG. 14 shows a side view of one of a group of claw spikes 50, also shown are: proximal end 51, length 52 distal end 53, threaded proximal end 54 and nuts 55.

Figure 15:
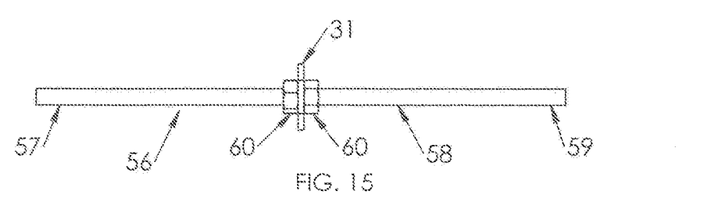
FIG. 15 shows an end view of T bar 50 joined to pivot arm 31.

FIG. 15 shows an end view of T bar 50 joined to pivot arm 31, also shown are first end 57 length 58 second end 59 and nuts 60.

FIG. 16 shows a side view of counter weight 61 and aperture 62.

FIG. 17 shows an end view of counter weight 61 joined to pivot arm 31, also shown are bolt 63 and nut 63.

Figures 18, 19:
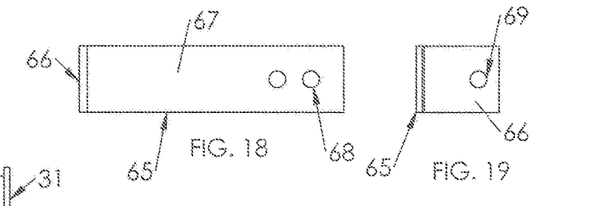
FIG. 18 shows a top view of base member mounting L bracket 65.
FIG. 19 shows an end view of base member mounting L bracket 65.

FIG. 18 shows a top view of base member mounting L bracket 65, also shown are: short arm 66, proximal long arm 67, and apertures 68.

FIG. 19 shows an end view of base member mounting L bracket 65, also shown are: sort arm 66 and clamp mounting aperture 69.

FIG. 20 shows a side view of L bracket to base member screws 70.

Figure 21:
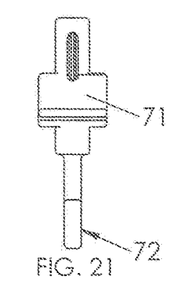
FIG. 21 shows a side view of hotline clamp 71.

FIG. 21 shows a side view of hotline clamp 71 and eye bolt 72.

Figure 22:
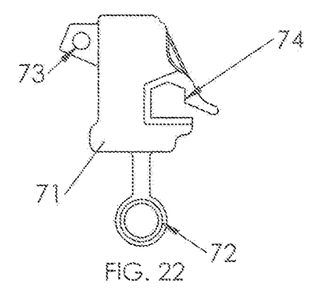
FIG. 22 shows an end view of hotline clamp 71.

FIG. 22 shows an end view of hotline clamp 71, also shown are: eye bolt 72, bonding cable clamp aperture 73 and jaw 74.

Figure 23:
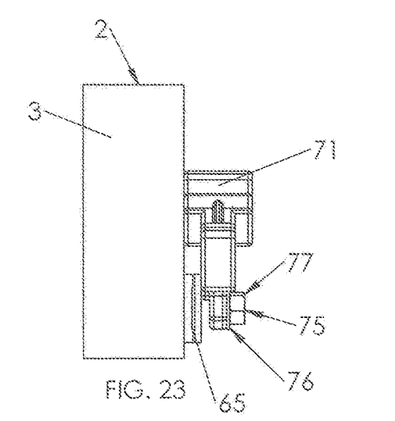
FIG. 23 shows a top view of hotline clamp 71 mounted to base member 2 (truncated to conserve space) via base member mounting L bracket 65.

FIG. 23 shows a top view of hotline clamp 71 mounted to base member 2 (truncated to conserve space) via base member mounting L bracket 65, bolt 75 and nut 77.

Figure 24:
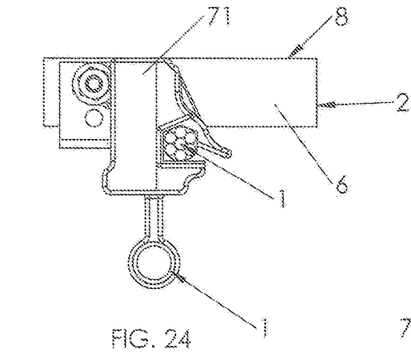
FIG. 24 shows an end view of hotline clamp 71 mounted to base member 2 via base member counting bracket 65.

FIG. 24 shows an end view of hotline clamp 71 mounted to base member 2, elongated structure 1, end surface 6 and second end region 8.

Figures 25, 26:
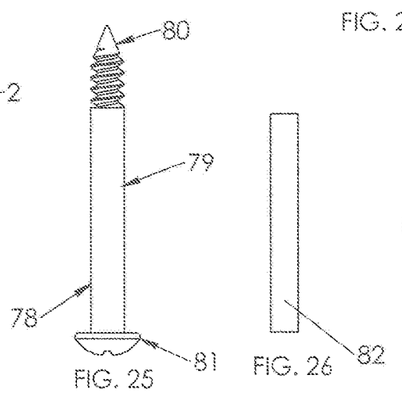
FIG. 25 shows a side view of rotating surface spines shaft 78.
FIG. 26 shows a side view of rotational outer member 82.

FIG. 25 shows a side view of rotating surface spines shaft 78.

FIG. 26 shows a side view of rotational outer member 82.

Figure 27:
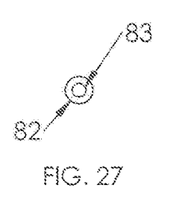
FIG. 27 shows an end view of rotational outer member 82.

FIG. 27 shows an end view of rotational outer member 82.

Figure 28:
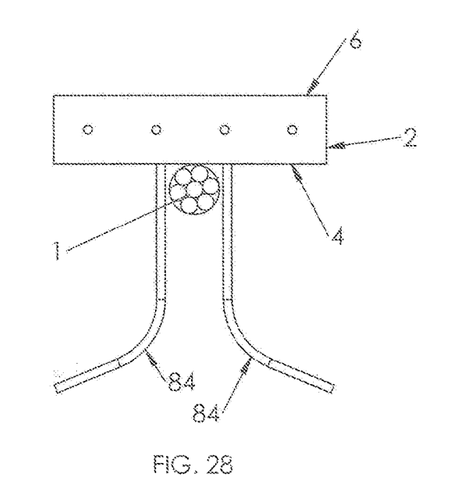
FIG. 28 shows an end view of base anti rotation spikes 84 joined on baser ember 2 resting on elongated structure 1.

FIG. 28 shows an end view of base anti rotation spikes 84 joined on base member 2 resting on elongated structure 1, end surface 6 and lower surface 4.

Figure 29:
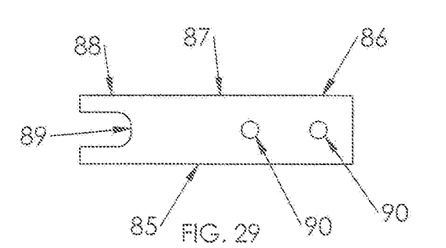
FIG. 29 shows a top view of spring stand off bracket 85.

FIG. 29 shows a top view of spring standoff bracket 85, also shown are: proximal end 86 length 87 distal U channel 89 and mounting apertures 90.

Figure 30:
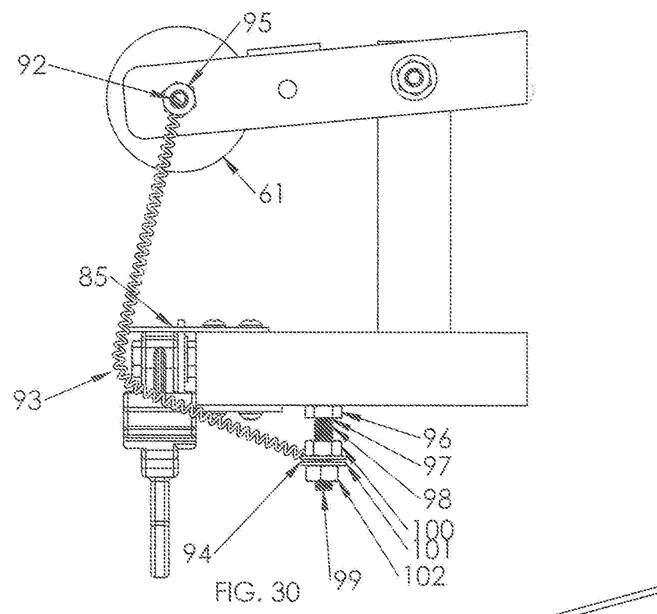
FIG. 30 shows the second end region 7 of base member 2 with attachments.

FIG. 30 shows the second end region of the base member (truncated) with pivot stand 25 attached to its upper surface of its mid region, Pivot arm 31 (truncated) is attached to the distal end of pivot stand 25, counter weight 61 is attached to Pivot arm 31, the attach bolt also serves as an attach point for spring first end loop 92 further attached by nut 95, spring length 93 is passed through spring standoff bracket 85 which is secured to the base member via screws 70, base member spring attach stud 96 is threaded into the lower surface of the base member, nut 100 and 102 with washers 101 between them serve to make the height of spring second loop end 94 adjustable, the hotline clamp is shown in the background behind the spring.

Figure 31:
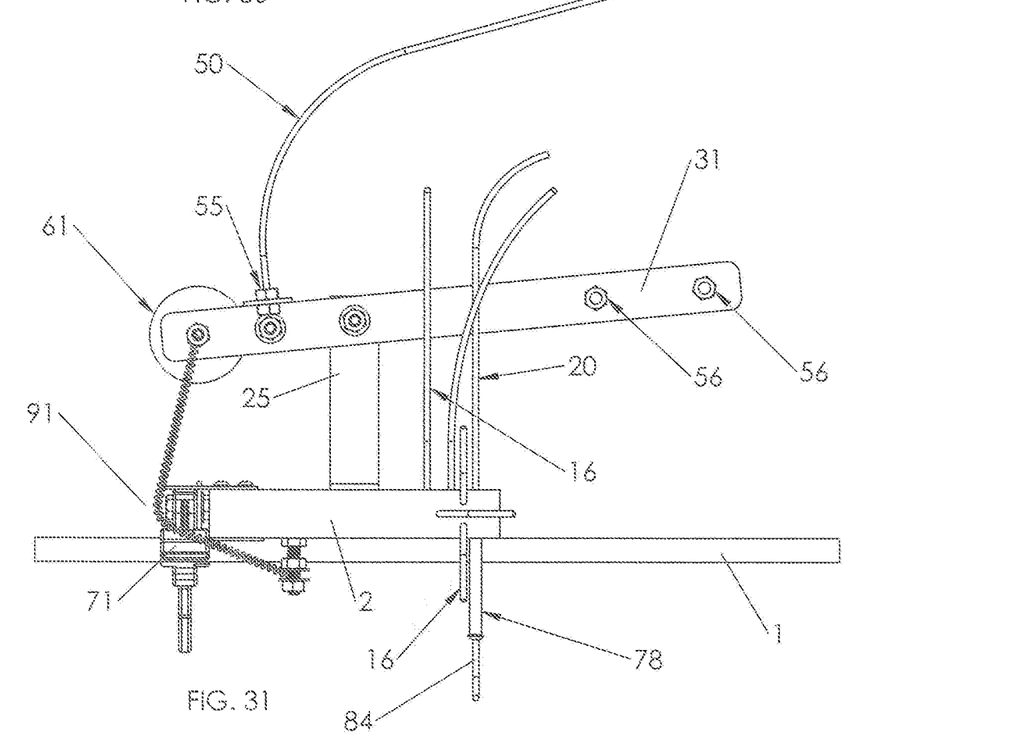
FIG. 31 shows a complete squirrel guard mounted on elongated structure 1 via hotline clamp 71.

FIG. 31 shows a complete squirrel guard mounted on elongated structure 1 via hotline clamp 71, further shown is base member 2 with pivot stand 25 attached to base member's upper surface of its mid region, pivot arm 31 attached to the distal end of pivot stand 25, T bars 56 are attached to the distal end of pivot arm 31, counter weight 61 is attached to proximal end of pivot arm 31, the bolt attaching counter weight 61 also serves as an attach point for spring 91 via first end loop secured by a nut, spring 91 is passed through the spring standoff bracket which is secured to the base member, the spring second end loop is adjustably attached to the spring attach stud, a plurality of the first group base spikes 16 are attached to base member 2 as are a plurality of the second group of base spikes 20, two rotating surface spines are attached to the lower surface of base member 2 as are base anti rotation spikes 84 which straddle elongated structure 1.

END

What is claimed is:

1. A squirrel guard system comprising:
    an elongated structure for which a deterrent to vermin traverse is desired;
    an elongated base member comprising: a length, width and thickness; upper, lower, side and end surfaces; a first end region, mid region and second end region;
    a plurality of base spikes having a proximal end, a length and a distal end;
    a plurality of base spike mounting means,
    said base spikes proximal end fixedly attached via said base spike mounting means to said base member's first end region and extending outwardly from the surfaces of said first end region,
    a first group of said base spikes comprising their distal ends pointed substantially radially from said base member's length,
    a second group of said base spikes comprising some portion of their length curved and their distal ends substantially pointed away from said base second end region;
    an arched pivot arm comprising a proximal end, mid region and distal end,
    a pivot stand means comprising a base end, length and a distal end,
    a pivot stand attach means,
    said pivot stand's base end attached via said pivot stand attach means to said base member's mid region upper surface substantially central to the width of said base member,
    said pivot stand's distal end accommodating a pivot arm attach means,
    said pivot arm's mid region accommodating a pivot arm to pivot stand pivot-able mounting means,
    a pivot arm to pivot stand pivot-able attach means accommodating said pivot arm's arc being substantially parallel to said base member's length and free movement of said pivot arm,
    said pivot arm's mid region pivot-ably attached to said pivot stand's distal end,
    said pivot arm's proximal end being nearest said base member's second end region and its distal end extending past the distal ends of said second group of base spikes;
    a claw base means comprising a length, width and thickness,
    said pivot arm's mid region nearest said proximal end accommodating a claw base mounting means,
    a plurality of claw spikes comprising a proximal end, a length and distal end,
    a plurality of claw spike mounting means,
    said claw spikes' proximal ends fixedly attached to said claw base substantially perpendicular to said claw base's length and width and spaced along its length via said claw spike mounting means,
    a claw base mounting means,
    said claw base mounting means accommodating mounting said claw base to said pivot arm between said pivot stand pivot-ably attachment and said pivot arm proximal end with said claw base's, length substantially perpendicular to said pivot arm's length,
    said claw spikes oriented away from said base member's upper surface,
    a portion of said claw spikes length curved so that their distal ends are substantially parallel to said base member's upper surface when said pivot arm's proximal end is closest to said base member's upper surface;
    at least one T bar having two end s, a mid region and a length,
    said pivot arm's distal end accommodation a bar mounting means,
    a T bar attaching means,
    said T bar attached via said T bar mid region proximal to said pivot arm's distal end,
    said T bar's length is substantially perpendicular to said pivot arm's length and parallel to said base member's upper surface and the T bar closest to said pivot arm's proximal end position accommodating arcing past said base spikes distal ends as said pivot arm is rotated about its pivot-ably attachment,
    said claw spikes positioned on said claw base to accommodate their passing between said base spikes as said pivot arm is rotated and their length sufficient to extend past the distal ends of said base spikes;
    a counter weight means,
    said pivot arm's proximal end accommodating a counter weight means,
    a counter weight attach means,
    said counter weight attached to said pivot arm's proximal end;
    a base member mounting means affixed to said base member accommodating removable mounting said base member on said elongated structure, having the base member's lower surface closest to said elongated structure, its length substantially parallel to the length of said elongated structure and its width substantially centered on said elongated structure; and
    said squirrel guard mounted on said elongated structure via said mounting means with said base member's upper surface substantially upward with said first end facing away from the feature for which protected from traverse by vermin is sought.

2. The system of claim 1 wherein said elongated structure is a power line.

3. The system of claim 1 wherein said elongated structure is a support cable.

4. The system of claim 1 further comprising;
two or more elongated rotating surface spines comprising:
a rotating surface spines shaft comprising a proximal end, length and distal end; [79-81]
said proximal end comprising a self-tapping screw thread,
said base member first end lower surface further comprising two or more rotating surface spine bores,
a rotational outer member,
said rotational outer member comprising a length, thickness and defining an axial aperture adaptive to spin on said rotating surface spines shaft,
said rotational outer member mounted over said rotating surface spines shaft,
an outer member retaining means affixed to said distal end of said rotating surface spines shaft, and
said rotating surface spines shaft proximal end fixedly mounted on said base member's lower surface of its first end region positioned as opposing pairs relative to said base member's width being at least the width of said elongated structure apart.

5. The system of claim 1 further comprising said base member mounting means comprising:
a base member mounting L bracket,
said L bracket having a short leg and a unitary long leg,
each said leg having a length, width and thickness,
said L bracket's short leg defining a clamp mounting aperture and its long leg defining at least two bracket mounting apertures,
a hot line clamp whose upper body defines a fastener aperture its bore being parallel to its said clamp's jaws,
a fastener adaptive to attach said clamp to said L bracket,
at least two L bracket to base member screws adaptive to mount said bracket to said mounting base,
said base member's second end defining at least two mounting bracket bores adaptive to said screws,
said clamp fastened to said L bracket via fastener to said short leg; and
said long leg of said L bracket fastened to said base member via said fasteners.

6. The system of claim 1 further comprising:
a base member anti rotation means affixed to the lower surface of said base member engaging a portion of said elongated structure.

7. The system of claim 1 further comprising:
a base member anti rotation means comprising,
two or more of said second group base spikes,
said spikes curved near their distal ends,
said base member further comprising two or more anti-rotation spikes bores on said base member first end region lower surface,
said bores opposing in reference to the center line of said base member and spaced the width of said elongated structure apart,
said bores accommodating a press fit to said spikes,
said spikes fixedly mounted to the lower surface of said base member, and
said spikes curved ends oriented away from the center line of said base member.

8. The system of claim 1 wherein said elongated structure is a support wire having one end substantially below its other end.

9. The system of claim 1 further comprising:
a recoil means acting on said pivot arm and said pivot stand urging said pivot arm's proximal end toward said upper surface of said second end region of said base member.

10. The system of claim 1 further comprising:
a recoil means comprising:
a cylindrical coil spring comprising a length and a first and second end loop,
a pivot arm spring attach means comprising,
said counter weight mounting bolt having an extended threaded shank,
a nut,
said spring's first end loop fitted over said counter weight mounting bolt and retained by said nut,
a spring standoff bracket comprising: a proximal end, midsection and distal end,
said distal end of said spring standoff bracket defining an open end U shape adaptive to slide-ably receive the diameter said coil spring,
standoff bracket mounting screws,
said base member further defining standoff mounting bores,
said standoff bracket's proximal end affixed to said base member's second end region of said via said screws with the length of said standoff bracket substantially parallel to the length of said base member and said distal end facing away from said base member,
a base member adjustable spring attach means comprising:
a threaded shaft,
two nuts and washers,
said base member lower second end surface further defining a spring attach bore,
said threaded shaft affixed to said base member via said attach bore,
a first said nut threaded onto said threaded shaft and a said washer,
said spring passing through said shape distal end of said standoff bracket,
said second end loop placed on said threaded shaft, and
a second said washer and said nut threaded onto said threaded shaft.

11. A squirrel guard system comprising:
an elongated structure for which a deterrent to vermin traverse is desired;
an elongated base member comprising: a length, width and thickness; upper, lower, side and end surfaces; a first end region, mid region and second end region;
a plurality of base spikes having a proximal end, a length and a distal end,
a plurality of base spike mounting means,
said base spikes proximal end fixedly attached to said base member's first end region and extending outwardly from the surfaces of said first end region,
a first group of said base spikes comprising their distal ends pointed substantially radially from said base member's length,
a second group of said base spikes comprising some portion of their length curved and their distal ends substantially pointed away from said base second end region,
a pivot stand means comprising a base end, length and a distal end,
a pivot stand attach means;
said pivot stand's base end attached via said attach means to said base member's mid region upper surface substantially central to the width of said base member;
a pivot arm comprising a proximal end, mid region and distal end;
said pivot stand's distal end accommodating a pivot arm attach means;

said pivot arm's distal end accommodation a T bar mounting means;
said pivot arm's mid region accommodating a pivot arm to pivot stand pivot-able mounting means;
said pivot arm's mid region nearest said proximal end accommodating a claw base mounting means;
said pivot arm's proximal end accommodating a counter weight means;
a pivot arm to pivot stand pivot-able attach means accommodating said pivot arm's arc being substantially parallel to said base member's length and free movement of said pivot arm,
said pivot arm's mid region pivot-ably attached to said pivot stand's distal end,
said pivot arm's proximal end being nearest said base member's second end region and its distal end extending past the distal ends of said second group of base spikes;
a claw base means comprising a length, width and thickness,
a plurality of claw spikes [50] comprising a proximal end, a length and distal end,
a plurality of claw spike mounting means,
said claw spikes' proximal ends attached to said claw base substantially perpendicular to said claw base's length and width and spaced along its length via said claw spike mounting means,
a claw base mounting means,
said claw base mounting means accommodating mounting said claw base to said pivot arm between said pivot stand pivot-ably attachment, and said pivot arm proximal end with said claw base's length substantially perpendicular to said pivot arm's length,
said claw spikes oriented away from said base member's upper surface,
a portion of said claw spikes length curved so that their distal ends are substantially parallel to said base member's upper surface when said pivot arm's proximal end is closest to said base member's upper surface;
at least one T bar having two end s, a mid region and a length,
a T bar attaching means,
said T bar attached proximal to said mid region proximal to said pivot arm's distal end,
said T bar's length is substantially perpendicular to said pivot arm's length and parallel to said base member's upper surface and the T bar closest to said pivot arm's proximal end position accommodating arcing past said base spikes distal ends as said pivot arm is rotated about its pivot-ably attachment,
said claw spikes positioned on said claw base to accommodate their passing between said base spikes as said pivot, arm is rotated by force applied to said T bar(s) and their length sufficient to extend past the distal ends of said base spikes;
a counter weight,
a counter weight attach means,
said counter weight attached to said pivot arm's proximal end;
two or more elongated rotating surface spines comprising:
a rotating surface spines shaft comprising a proximal end, length and distal end,
said proximal end comprising a self-tapping screw thread,
said base member first end lower surface further comprising two or more rotating surface spine bores,
a rotational outer member,
said rotational outer member comprising a length, thickness and defining an axial aperture adaptive to spin on said rotating surface spines shaft,
said rotational outer member mounted over said rotating surface spines shaft,
an outer member retaining means, affixed to said distal end of said rotating surface spines shaft,
said rotating surface spines shaft proximal end fixedly mounted on said base member's lower surface of its first end region positioned as opposing pairs relative to said base member's width being at least the width of said elongated structure apart;
a base member mounting means,
said base member mounting means comprising:
a base member mounting L bracket,
said L bracket having a short leg and a unitary long leg,
each said leg having a length, width and thickness,
said L bracket's short leg defining a clamp mounting aperture and its long leg defining at least two bracket mounting apertures,
a hot line clamp whose upper body defines a fastener aperture, its bore being parallel to its said clamp's jaws,
a fastener adaptive to attach said clamp to said L bracket,
at least two L bracket to base member screws adaptive to mount said bracket to said mounting base,
said base member's second end defining at least two mounting bracket bores adaptive to said screws,
said clamp fastened to said L bracket via fastener to said short leg,
said long leg of said L bracket fastened to said base member via said fasteners;
a base member anti rotation means affixed to the lower surface of said base member engaging a portion of said elongated structure; and
said squirrel guard mounted on said elongated structure via said mounting means with said base member's upper surface substantially upward with said first end facing away from the feature for which protected from traverse by vermin is, sought.

12. The system of claim 11 wherein said elongated structure is a power line.

13. The system of claim 11 wherein said elongated structure is a support cable with one end substantially below its other end.

14. The device of claim 11 further comprising:
a recoil means with mounting means urging said proximal end of said pivot arm to return to a position near or on said base member's upper surface.

15. The device of claim 11 further comprising:
a recoil spring attachment comprising:
a cylindrical coil spring comprising a length and a first and second end loop,
a pivot arm spring attach fastener,
said pivot arm's proximal end further defining a spring attach aperture,
a base member adjustable spring attachment,
a spring standoff bracket,
said distal end of said spring standoff bracket defining an open end U channel which slide-ably receives a portion of said coil spring's length,
said spring standoff bracket's proximal end attached to the second end region of said base member with the length of said spring standoff bracket substantially parallel to the length of said base member and said open end channel opening away from said base member;

said base member adjustable spring attachment affixed to the lower surface of said second end of said base member;
said base member spring attaching comprising:
a threaded rod perpendicularly attached to the lower surface of said base member;
an internally threaded spring height adjuster;
said spring height adjuster threaded over said threaded rod till it is near the lower surface of said base member;
said first end loop of said cylindrical coil spring fitted on said pivot arm spring attach fastener;
a portion of said cylindrical coil spring slid into said open end channel;
said second end loop of said spring passed over said threaded rod until said end loop rests on said spring height adjuster, and
said spring height adjuster turned moving said end loop away from said lower surface until the desired spring tension is achieved.

16. A squirrel guard system comprising:
an elongated structure for which a deterrent to vermin traverse is desired;
an elongated base member comprising: a length, width and thickness; upper, loser, side and end surfaces; a first end region, mid region and second end region;
a plurality of base spikes having a proximal end, a length and a distal end,
said base member further defining a plurality of base spike mounting bores which accommodate a press fit with said base spike proximal ends,
said base spikes proximal end fixedly attached to said base member's first end region and extending outwardly from the surfaces of said first end region,
a first group of said base spikes comprising their distal ends pointed substantially radially from said base member's length,
a second group of said base spikes comprising some portion of their length curved and their distal ends substantially pointed away from said base second end region;
a pivot stand comprising an L bracket having a base end and a long leg each having a length, width and thickness,
said pivot stand's base end further defining two pivot stand mounting apertures,
said pivot stand's long leg defining a pivot arm mounting aperture distal to said base end,
pivot stand attach screws,
said base member further defining two pivot stand mounting bores,
said pivot stand's base end attached via said screws to said base member's mid region upper surface substantially central to the width of said base member,
said pivot stand's long leg width substantially parallel to the length of said base member;
a pivot arm [31] comprising a proximal end, mid region and distal end,
said pivot arm's mid region defining a pivot arm mounting aperture,
a pivot arm to pivot stand pivot-able mounting bolt, washers and locknut,
said pivot arm joined to said pivot stand via said bolt accommodating free movement of said pivot arm,
said pivot arm's proximal end being nearest said base member's second end region and its distal end extending past the distal ends of said second group of base spikes;
a claw base,
claw spikes,
a claw base mounting T bracket,
said claw base having a length, width and thickness,
said T bracket having two opposing upper blades and one lower blade,
said upper blades each defining a claw base mounting aperture,
said lower blade defining a claw base to pivot arm mounting aperture,
a plurality of claw spikes comprising a proximal end, a length and distal end,
said claw spikes proximal end being threaded,
said claw base defining a plurality of claw spike mounting apertures along said length,
a plurality of claw spike mounting nuts,
said claw spikes mounted to said claw base via said claw spike threaded proximal end, claw spike mounting apertures and nuts,
said claw spikes' proximal ends attached to said claw base substantially perpendicular to said claw base's length and width and spaced along its length via said claw spike mounting means,
said claw base further defining two central to said length claw base to mounting T bracket apertures, fasteners companionate to said apertures,
said pivot arm's mid region between said pivot arm mounting aperture and said proximal end defining a T bracket mounting aperture,
a bolt, washer and lock nut companionate to said T bracket mounting aperture,
said claw base mounted to said T bracket and said T bracket mounted to said pivot arm with said claw base's length substantially perpendicular to said pivot arm's length,
said claw spikes oriented away from said base member's upper surface,
a portion of said claw spikes length curved so that their distal ends are substantially parallel to said base member's upper surface when said pivot arm's proximal end is closest to said base member's upper surface,
said claw spikes positioned on said claw base to accommodate their passing between said base spikes as said pivot arm rotates and their length sufficient to extend past the distal ends of said base spikes;
at least one T bar [56] having two end s and a length and a mid region,
said T bar mid region being threaded,
said pivot arm's distal end defining at least one T bar mounting apertures,
two T bar attaching nuts per T bar,
said T bar attached via said T bar threaded mid region, said T bar mounting aperture(s) and said nuts,
said T bar's length is substantially perpendicular to said pivot arm's length and parallel to said base member's upper surface and the T bar closest to said pivot arm's proximal end position accommodating arcing past said base spikes distal ends as said pivot arm is rotated about its pivot-ably attachment;
a counter weight,
said counter weight having a mass and defining a counter weight mounting aperture,
a counter weight mounting bolt and nut,
said pivot arm's proximal end defining a pivot arm counter weight mounting aperture,
said counter weight mounted to said pivot arm's proximal end;

a recoil means comprising:
a cylindrical coil spring comprising a length and a first and second end loop,
a pivot arm spring attach means comprising,
said counter weight mounting bolt having an extended threaded shank,
a nut,
said spring's first end loop fitted over said counter weight mounting bolt and retained by said nut,
a spring standoff bracket comprising: a proximal end, midsection and distal end,
said distal end of said spring standoff bracket defining an open end U shape adaptive to slide-ably receive the diameter said coil spring,
standoff bracket mounting screws,
said base member further defining standoff mounting bores,
said standoff bracket's proximal end affixed to the second end region of said base member via said screws with the length of said standoff bracket substantially parallel to the length of said base member and said distal end facing away from said base member,
a base member adjustable spring attach means comprising:
a threaded shaft,
two nuts and washers,
said base member lower second end surface further defining a spring attach bore,
said threaded shaft affixed to said base member via said attach bore,
a first said nut threaded onto said threaded shaft and a said washer,
said spring passing through said U shape distal end of said standoff bracket,
said second end loop placed on said threaded shaft,
a second said washer and said nut threaded onto said threaded shaft;
two or more elongated rotating surface spines comprising:
a rotating surface spines shaft comprising a proximal end, length and distal end,
said proximal end comprising a self-tapping screw thread,
said base member first end lower surface further comprising two or more rotating surface spine bores;
a rotational outer member,
said rotational outer member comprising a length, thickness and defining an axial aperture adaptive to spin on said rotating surface spines shaft,
said rotational outer member mounted over said rotating surface spines shaft,
said a rotating surface spines shaft distal end being a screw head,
said base member lower surface defining two or more a rotating surface spines shaft mounting bores,
said rotating surface spines shaft proximal end fixedly mounted on said base member's lower surface of its first end region positioned as opposing pairs relative to said base member's width being at least the width of said elongated structure apart;
a base member mounting means comprising:
a base member mounting L bracket,
said L bracket having a short leg and a unitary long leg,
each said leg having a length, width and thickness,
said L bracket's short leg defining a clamp mounting aperture and its long leg defining at least two bracket mounting apertures,
a hot line clamp whose upper body defines a fastener aperture, [24] its bore being parallel to its said clamp's jaws,
a fastener adaptive to attach said clamp to said L bracket,
at least two L bracket to base member screws adaptive to mount said bracket to said mounting base,
said base member's second end defining at least two mounting bracket bores adaptive to said screws,
said clamp fastened to said L bracket via fastener to said short leg,
said long leg of said L bracket fastened to said base member via said fasteners;
a base member anti rotation means,
said base member anti rotation means comprising:
two or more of said second group spikes,
said spikes curved near their distal ends,
said base member further comprising two or more anti-rotation spike bores on its first end region lower surface,
said bores opposing in reference to the center line of said base member and spaced the width of said elongated structure apart,
said bores accommodating a press fit to said spikes,
said spikes fixedly mounted to the lower surface of said base member,
said spikes curved ends oriented away from the center line of said base member; and
said squirrel guard mounted on said elongated structure via said mounting means with its upper surface substantially upward with said first end facing away from the feature for which protected from traverse by vermin is sought.

17. The system of claim 16 wherein said elongated structure is a power line.

18. The system of claim 16 wherein said elongated structure is a support cable.

* * * * *